Oct. 19, 1965     E. F. WESTLAKE, SR     3,212,132
APPARATUS FOR EXTRUSION MOLDING OF THERMOPLASTIC RODS
Filed Oct. 29, 1962     5 Sheets-Sheet 1
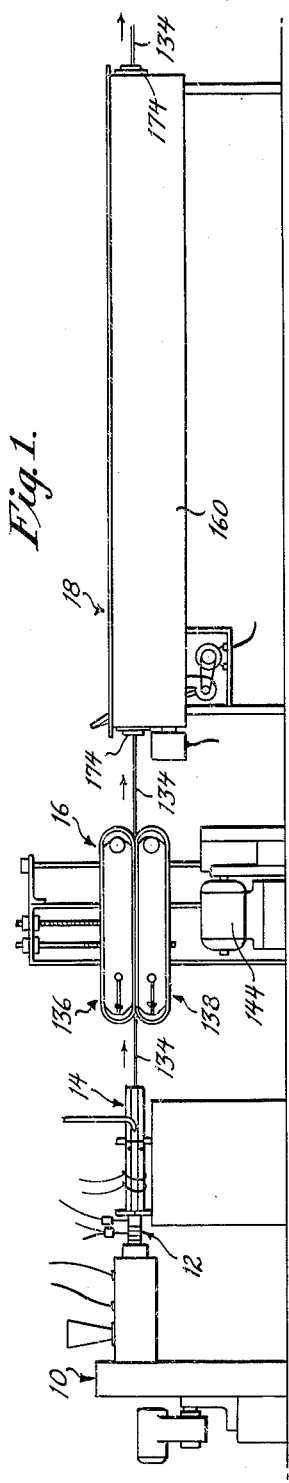
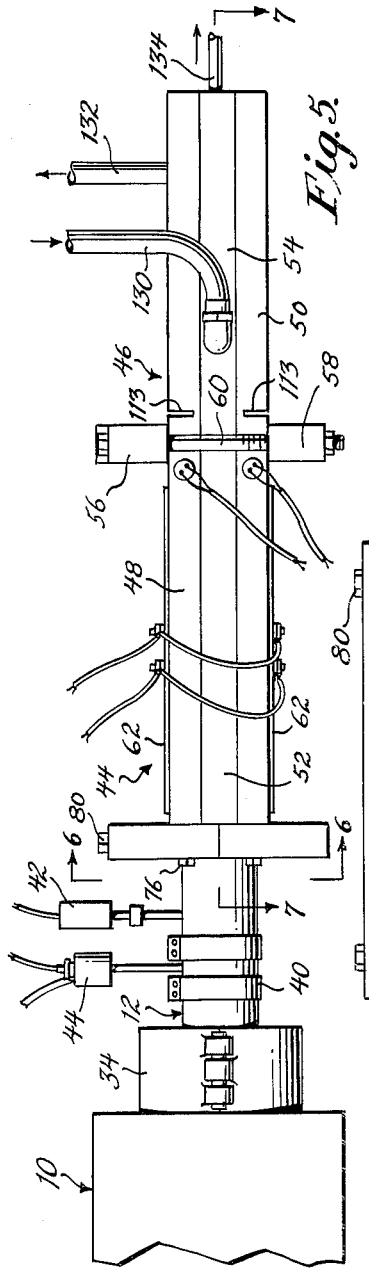
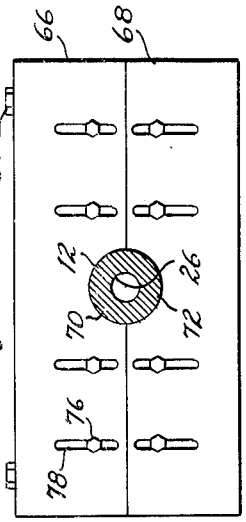
INVENTOR.
EDWARD F. WESTLAKE, SR.
BY
*Millman and Jacobs*
ATTORNEYS.

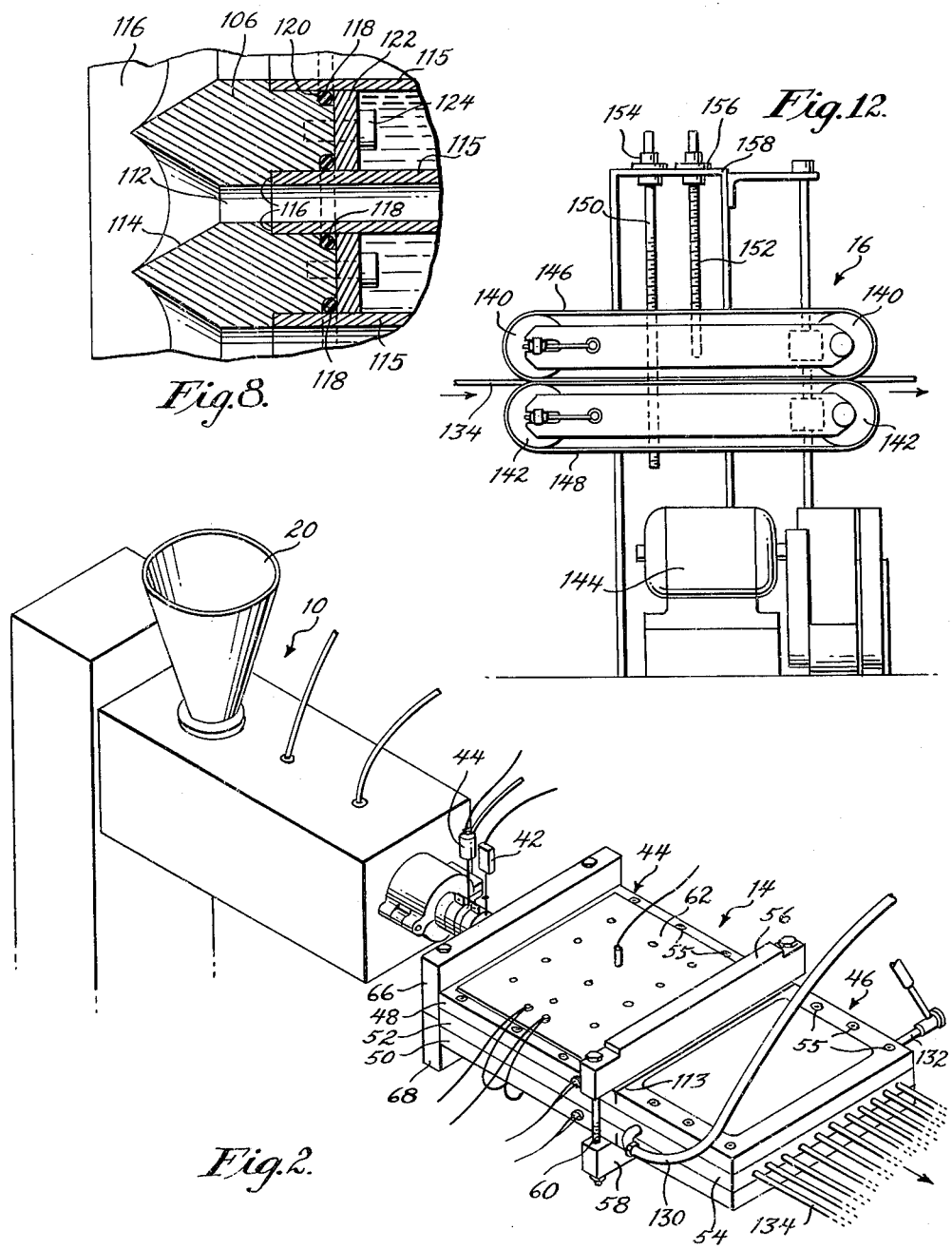

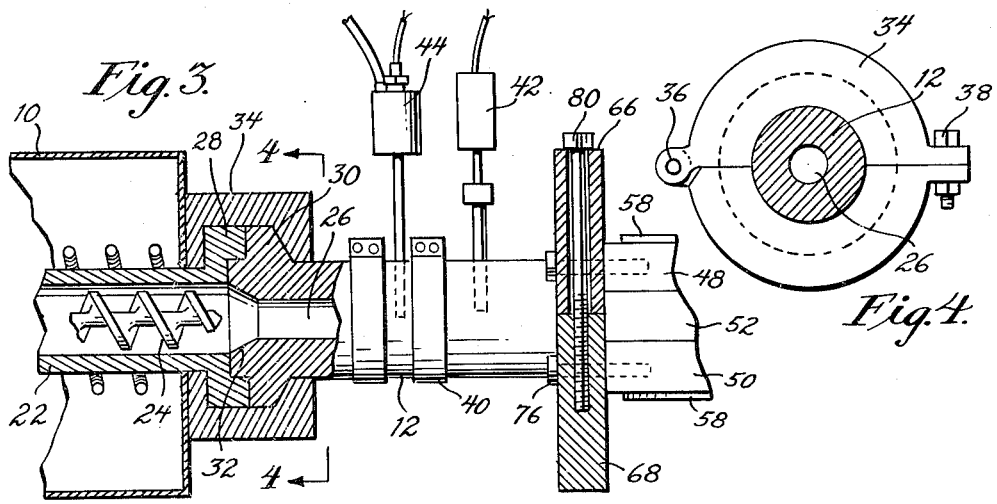
Fig. 3.
Fig. 4.
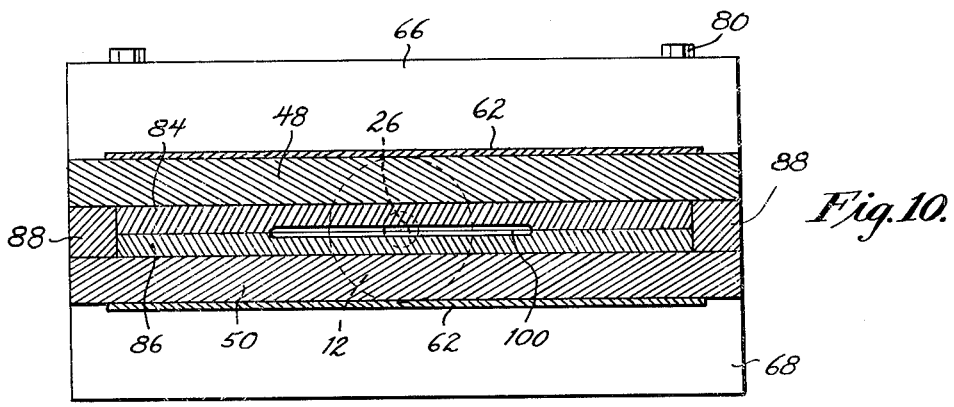
Fig. 10.
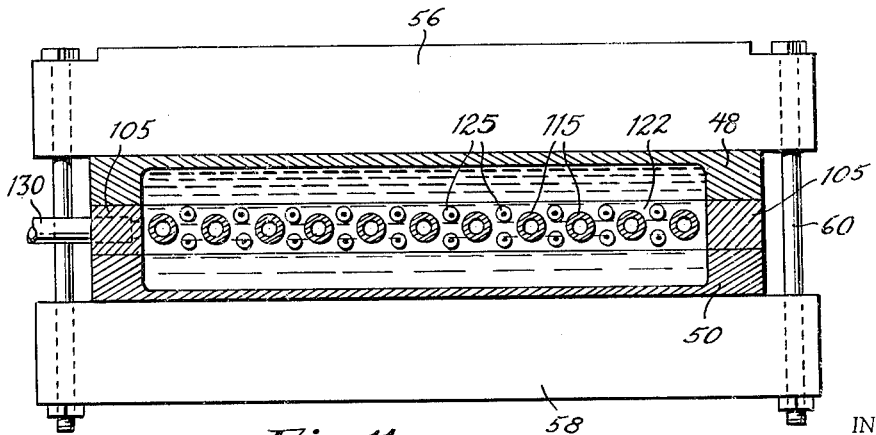
Fig. 11.
INVENTOR.
EDWARD F. WESTLAKE, SR.
BY Millman and Jacobs
ATTORNEYS.

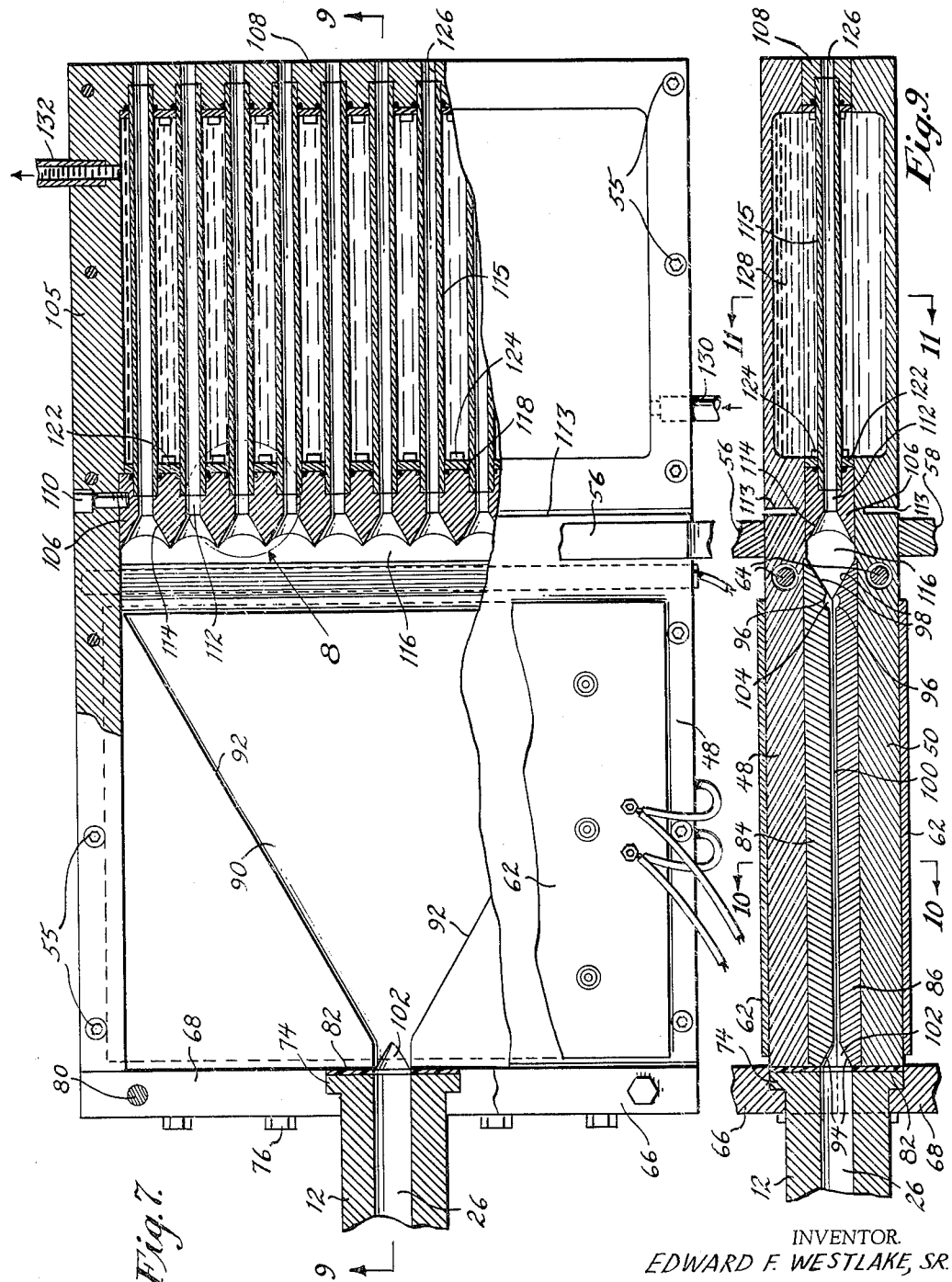

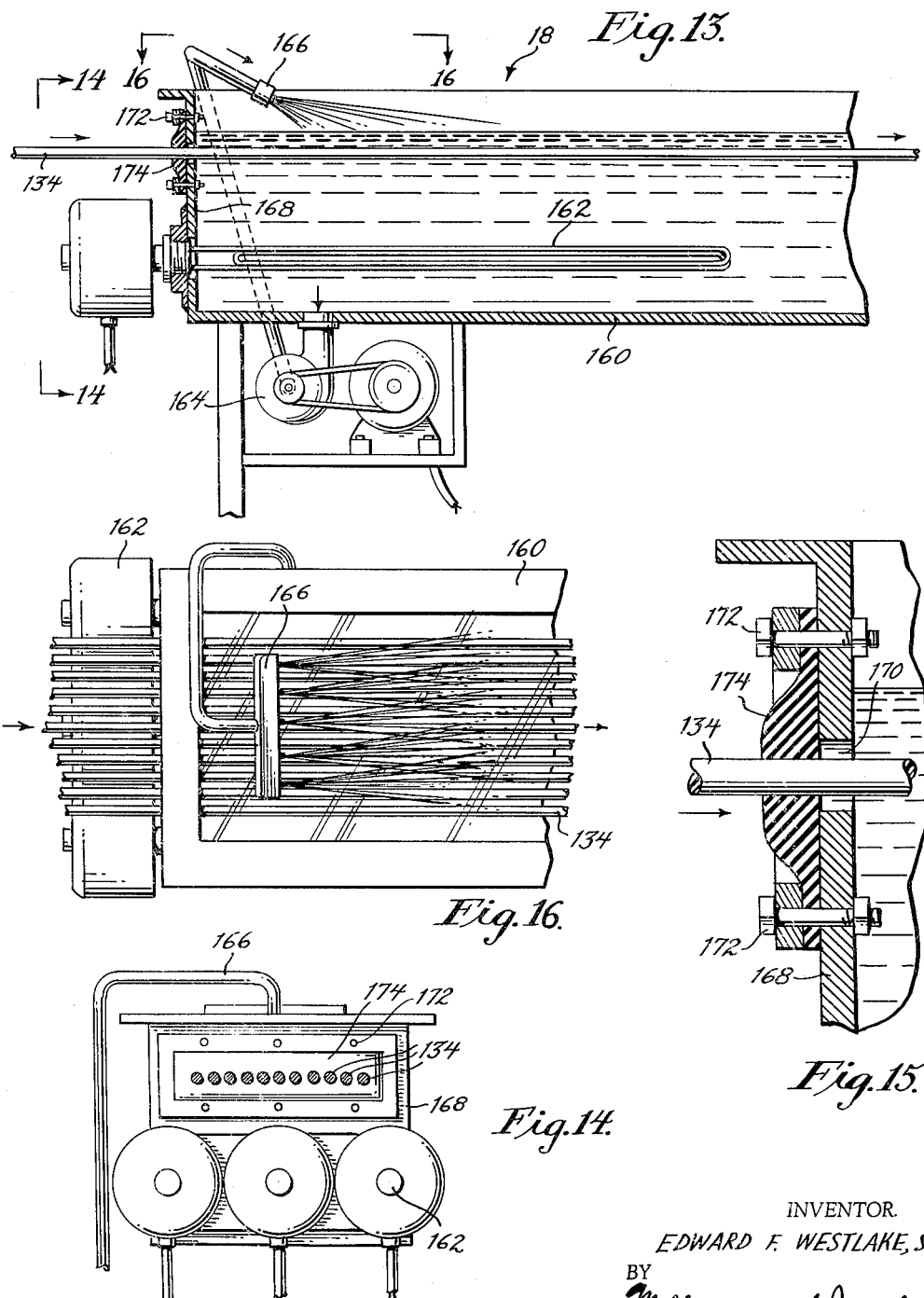

United States Patent Office 3,212,132
Patented Oct. 19, 1965

3,212,132
APPARATUS FOR EXTRUSION MOLDING OF THERMOPLASTIC RODS
Edward F. Westlake, Sr., 1903 Melrose Ave., Havertown, Pa.
Filed Oct. 29, 1962, Ser. No. 233,811
8 Claims. (Cl. 18—12)

This invention relates to the production of thermoplastic rod, particularly of nylon, acetals, polycarbonates, polypropylenes, high density linear molecular low pressure polyethylene and low density linear molecular high pressure polyethylene. The reference herein to rod is intended to mean elongated pieces of any cross sectional shape, whether solid or tubular, although solid rod of substantially circular cross sectional shape is typical.

The primary object of the invention is to provide equipment for simultaneously producing a plurality of very high quality rods by continuous extrusion molding in such a manner that rates of delivery are attained which are considerably in excess of those capable of attainment with present allegedly continuous rod extrusion molding equipment.

Another object of the invention is to provide equipment for simultaneously producing a plurality of rods by continuous extrusion molding which is readily, easily and inexpensively adaptable by interchangeability of inserts for the production of rods of varying diameters, from small, in the order of magnitude of .060" to 1.00", to large.

Another object of the invention is to provide equipment for simultaneously producing a plurality of rods by continuous extrusion molding in which the rods produced are substantially free of voids and of stop-start annular rings along their lengths without the need to provide means to automatically control infeed pressure between lower and upper limits in correlation with extruder screw speed or in correlation with the speed of rotation of the means engaging the solidified rods.

Another object of the invention is to provide equipment for the simultaneous production of a plurality of rods by continuous extrusion molding in which rapid change of material to material and color to color can be effected without the need for cleaning the die before transition.

Yet another object of the invention is to provide an apparatus for simultaneously producing a plurality of rods by continuous extrusion molding in which thermal degradation due to hang up or reduced flow of molten plastic before entering the forming tubes is prevented.

The foregoing objects are attained by equipment which comprises a screw extruder which delivers molten plastic under pressure to a die unit containing a plurality of spaced forming tubes of desired internal diameters where the rods are partially or completely solidified, the exiting rods passing between a pair of adjustably spaced conveyors which apply a pulling or braking force, depending upon whether the diameters are small or large, over a relatively long portion of the length of the rods and then through an annealing bath to eliminate stresses upon cooling. The rods produced are uniform in diameter requiring, in many cases, no additional finishing for use in screw machines.

A particular feature of the invention as described above is the provision in the die unit of a spreader member which causes the molten plastic to fan out in a substantially flat mass of thickness considerably less than the diameter of the extruder delivery tube whereby the molten plastic can be properly fed simultaneously and with substantially uniform pressure to the inlet ends of all of the forming tubes.

Another feature of the invention is the provision of a die unit as above described which is equipped with means to remove the existing forming tubes and readily replace them with others of the same outer diameters but of different inner diameters.

These and other objects and features of the invention will become more apparent as the following description proceeds in conjunction with the accompanying drawings, wherein:

FIGURE 1 is a side elevation of the overall equipment;
FIGURE 2 is a perspective view of the extrusion and die unit;
FIGURE 3 is an enlarged elevation of the infeed end of the equipment, partly broken away and shown in section;
FIGURE 4 is a sectional view taken on the line 4—4 of FIGURE 3;
FIGURE 5 is a side elevation of the infeed end and die unit;
FIGURE 6 is a sectional view taken on the line 6—6 of FIGURE 5;
FIGURE 7 is a sectional view taken on the line 7—7 of FIGURE 5;
FIGURE 8 is an enlarged fragmentary detail of the inlet end of the forming tubes shown in FIGURE 7;
FIGURE 9 is a sectional view taken on the line 9—9 of FIGURE 7;
FIGURE 10 is a sectional view taken on the line 10—10 of FIGURE 9;
FIGURE 11 is a sectional view taken on the line 11—11 of FIGURE 9;
FIGURE 12 is a side elevation of the means for pulling or applying a braking force to the solidified rods as they exit from the forming tubes;
FIGURE 13 is an enlarged fragmentary vertical sectional view through the annealing tank;
FIGURE 14 is an elevation looking from the line 14—14 of FIGURE 13;
FIGURE 15 is an enlarged sectional detail of the diaphragm through which a rod passes as shown in FIGURE 13; and
FIGURE 16 is an elevation looking down on the annealing tank from the line 16—16 of FIGURE 13.

Specific reference is now made to the drawings in which similar reference characters are used for corresponding elements throughout.

The overall equipment, shown in FIGURE 1, comprises an extruder 10, a molten plastic delivery tube 12, a die unit 14, a means to apply a pulling or braking force to the solidified rod 16 and an annealing bath 18. The extruder is conventional and is of the type in which the powdered plastic or pellets, such as nylon, acetals, polycarbonates, polypropylenes and polyethylene, are fed via a hopper 20 into a heated barrel 22 to melt the plastic which is conveyed under pressure by a screw 24 that is axially rotatable in the barrel. If desired, an extruder may be employed in which the screw speed can be pre-set at different magnitudes.

In order that the infeed to the die unit be uniform, the diameter of the bore 26 of the tube 12, see FIGURE 3, is reduced relative to that of the barrel 22, as for example from 1½" internal diameter of the barrel to ¾" internal diameter of the tube. This is accomplished by providing mating stepped shoulders 28 and 30 on the corresponding ends of the barrel and tube respectively, the bore 26 flaring out by a 60° included angle cone as at 32 from its diameter to that of the barrel at the face of the shoulder 30. The mating shoulders 28 and 30 are removably retained by a split clamp 34 whose halves are pivoted as at 36 and held in a closed position by a bolt and nut 38 diametrically opposite the pivot. To keep the plastic molten in the delivery tube 12 the same is provided with heaters 40, band or cartridge. The tube may also be operatively connected to a thermocouple 42 to control the temperature of the molten plastic. A transducer and alarm 44 act as an indicator when the pressure exceeds a particular value.

The die unit 14 is substantially rectangular and includes two sections, a forward one 44 which is heated and contains the spreader and a rear one 46 which contains the forming tubes and is cooled to partially or totally solidify the rods. As will be seen from FIGURES 2, 5, 7, 9, 10 and 11, the unit includes an upper metallic member 48, a lower co-extensive metallic member 50 and forward and rear intermediate members 52 and 54 which are removably held in assembly by a suitable socket head cap screws 55. A pair of transversely extending upper and lower centrally disposed bars 56 and 58 and elongated bolts and nuts 60 securing the bars together are provided for a purpose later to appear.

At the forward section 44, the upper and lower members 48 and 50 are provided with electrical heating elements 62 preferably in the form of metallic cartridge plates bolted to the upper and lower members, there being additional electrical heating elements 64 transversely disposed in these members adjacent the header.

The molten plastic delivery tube 12 is connected to the forward or spreader section 44 of the die unit by providing a pair of upper and lower blocks 66 and 68 having central semicircular stepped openings which form a circular opening receiving the tube 12 and an annular recess receiving an annular flange 74 on the end of the tube, as shown in FIGURE 7. Headed bolts 76 extend horizontally through vertical slots 78 in the front end faces of said blocks and into threaded openings extending horizontally through the front end faces of the upper and lower members 48 and 50 of the die unit as shown in FIGURES 3 and 6. Thus the blocks are adjustable vertically to accommodate delivery tubes of varying outside diameters, the blocks being finally secured together by headed bolts 80 that extend vertically through the upper block 66 and into threaded openings in the lower block. To insure against leakage, a Teflon gasket 82 is interposed between the inner or rear faces of the blocks and the rear faces of the upper and lower die unit members 48 and 50.

The unit 52 intermediate the upper and lower members 48 and 50 constitutes the spreader and comprises a pair of upper and lower plates 84 and 86 disposed beneath said members and confined between intermediate longitudinal bars 88. The inner or mating faces of said plates 84 and 86 are each provided with triangular recesses 90 whose sides 92 extend from the corners of the rear edge of the plate to an apex which is located centrally of the opposite edge of the plate and on the axis of the tube bore 26, as seen in FIGURES 7 and 9. Each plate 84 and 86 includes a bevel or chamfer 94 flaring outwardly to the inner diameter of the delivery tube bore 26. The preferred included angle of each triangular recess is 60° and at the base thereof, the same is contiguous with a transverse groove 96 and then with an outwardly flaring chamfer or bevel 98 also extending transversely across the plate. Thus when the plates 84 and 86 are secured together the mating recesses 90 form a triangular spreader cavity 100, the mating bevels 94 form a substantially conical reduction zone 102 having a preferred included angle of 60° between the bore 26 and the cavity 100, the mating grooves 96 form a transverse gutter 104, and the mating bevels 98 form an outwardly flaring transverse expansion zone having a preferred included angle of 60°. The conical zone 102 smoothly reduces the cross sectional area of flow of molten plastic from the tube 12 having a ¾" internal diameter to the depth of the cavity 100 which is 0.187". Thus the cavity spreads the round flow into a flat triangular ribbon whose base extends across the entire width of die unit. It is to be noted that while the triangular spreader cavity is shown as formed by the mating recesses 90 of the upper and lower plates 84 and 86, the same may be accomplished by making one plate flat and providing the recess only in the other plate.

The intermediate member 54 of the rear member 46 of the die unit consists of longitudinal bars 105 (which are extensions of bars 88) and transverse bars, the transverse bar 106 closest the spreader being a front header and the transverse bar 108 at the other end of the member 46 being a rear or discharge header. The headers are removably attached to the longitudinal bars 105 by appropriate screws 110.

The front header 106 includes a plurality of transversely spaced through bores 112, see FIGURE 8, of predetermined diameter each terminating in an outwardly flaring conical chamfer or bevel 114 of preferred included angle of 60° whose edge is contiguous with the edge of an adjacent bevel and with the edges of the bevels 98 thereby forming a transversely extending zone 116 which allows some gradual expansion of the molten plastic issuing from the spreader and then its gradual contraction down to the diameter of the bores 112.

It will be noted that the upper and lower plates 48 and 50 are provided with deep lateral slits 113 in vertical alignment with the entrance of the bores 112 for the purpose of reducing heat transfer from the heated front to the cooled rear sections of the die unit. The clamp bars 56 and 58 are located over the expansion-contraction zone 114–116 so that pressure may be adjustably applied through operation of bolts and nuts 60 to counteract an increase in pressure of the molten plastic tending to move the plates 48 and 50 apart at said zone 114–116.

Forming tubes 115 are provided each having an infeed end which extends and is press-fit into recesses 116 in the header 106 about each bore 112. A ring 118 slips over the forming tube and fits into a further recess 120 in the end of the header, the rings serving as water gaskets or seals. The rings are retained in position by an apertured bar 122 which spans the header and through which the forming tubes pass, the bar bearing against the rings and being held removably in place by bolts 124. Note also that the transverse heating elements 64 are disposed immediately adjacent the zone 116 to keep the material molten as it enters the infeed ends of the forming tubes.

The discharge header 108 also contains a plurality of spaced through bores 126 of the same internal diameters as and in horizontal alignment with the bores 112 of the front header. The discharge ends of the forming tubes 115 are removably retained in said discharge header about and in communication with said bores 126 and sealed against water leakage in the same manner as described above for removably mounting and sealing the infeed ends of the forming tubes in the front header. Thus a plurality of rods can be formed of different diameters by merely removing the existing forming tubes and replacing them with tubes of the same outer diameters but different inner diameters. At times it may be desirable to completely remove the front and discharge headers and attached forming tubes and replace them with an entirely new unit with tubes of different internal and external diameters.

The upper and lower members 48 and 50 are formed with recesses through their inner faces to form a cavity 128 surrounding said forming tubes for the circulation of cooling fluid, the inlet 130 extending through longitudinal member 105 at one side and the outlet 132 extending through longitudinal member 105 on the opposite side of the rear section 46 of the die unit. The temperature of the fluid is maintained below the solidification point of the particular plastic so that the molten plastic can partially or totally solidify into rods 134 which issue out of the discharge header as shown in FIGURES 1, 2 and 5.

As the rods issue from the discharge header, they are engaged by the means 16 for applying a braking or pulling force thereon. The means 16 comprises a pair of spaced conveyors 136 and 138 of the endless belt type between which the solidified rods pass. The conveyor rollers 140 and 142, which are driven in unison by a suitable motor 144 via a variable speed drive 145, extend transversely and the endless belts 146 and 148 are entrained over the rollers and hence extend and move in a generally longitudinal direction. The distance between the lower flight of the upper conveyor and the upper flight of the lower conveyor can be adjusted by vertical screws 150 and 152 which are secured to the conveyors and pass through nuts 154 and 156 carried by a bracket 158, the conveyors being mounted for vertical sliding movement on said bracket. By adjusting the speed of and the spacing between the conveyors, the desired force is applied to the rods over a substantial length thereof in view of the length of the conveyor belts which is in the order of magnitude of several feet. The force applied to the issuing rods pull them out of the die unit when the diameters of the rods are small, i.e. .060″ to 1.00″, since solidification across the length and cross-section thereof in the forming tubes takes place relatively rapidly and there is relatively little contraction of solidified annulus away from the inner walls of the tubes. On the other hand, when relatively large diameter rods are made, the conveyors apply a back pressure against the mass in the tubes because the solidification is such that the solidified annulus shrinks away from the inner wall requiring such a back pressure to allow the voids to be properly filled in and the annulus to be urged against the inner wall of the tube; otherwise the mass will run out of the tubes as an unformed mass or imperfectly formed rods. The use of elongated rubber belt conveyors permits application of uniform force upon the rods and avoids distortion of the rods normally encountered with the grooved metallic exit rollers now in use.

When the rods leave the conveyors, they are still hot. They can be air cooled, but this is generally time consuming and frequently results in production of undesirable stresses in the rods. To offset this it is advantageous to anneal the rods. Thus the rods are made to pass through the annealing bath 18 which consists of a tank 160 in which are mounted heating elements 162, preferably electrical, the bath itself being oil which is delivered to the tank by an oil pump 164 via manifold sprayer 166. The tank is heated at the end wall 168 closest to the extruder so that less heat will be required to elevate the rods to stress relieving temperatures and thereby diminish possible heat distortion. The tank may be segmented to provide separate temperature chambers.

To minimize bending of the rods during annealing and cooling and to seal off the tank, the end wall 168 includes enlarged horizontally spaced holes 170 across which is mounted, as by bolts 172, a rubber membrane 174 having holes of smaller diameter than those of holes 170 but in alignment therewith. The rods 134 extend through the holes in the membrane 174 and holes 170 of the end wall 168 as they pass through the annealing fluid or oil. The rods are free to move axially even though the membrane does exert some gripping action. The other end wall of the tank may also be constructed in the same manner as end wall 168 and may be provided with a similar membrane 174.

A problem which is often encountered in the continuous extrusion molding of thermoplastics is one of thermal degradation of the material when it hangs up or is retarded in its movement in a hot zone due in part to the geometry of the passages in which the molten material moves. Such hang up surfaces may be operative when going from the tube 12 to the spreader cavity 100 through the gutter 104 to the header bar 106 and into the forming tubes 115. This thermal degradation can contaminate the sound materials. To avoid this, a heat stable plastic, such as high density, low pressure linear molecular polyethylene, is run through the equipment in a separate operation until rod is formed and emerges from the discharge header. This heat stable material smooths over and coats the hang up areas permitting subsequent molding of heat degradable material without hang up.

It is also desirable to coat the forming tubes and the bores of the header bars with Teflon.

In a typical run, the method and equipment hereinabove described has simultaneously molded 21 rods of ¼″ diameter from Delrin, a formaldehyde based acetal resin, at a delivery rate of 6 in./min./rod using an extruder with 1½″ I.D. barrel, a ¾″ I.D. feeder tube, extruder temperatures of 370–390° and an extruder pressure of 600–800 p.s.i., screw speeds of 18–21 r.p.m., a melt temperature of about 390° F., a temperature in the spreader section of the die unit of about 370° F., a water temperature in the cooling section of the die unit of about 90° F. and annealing temperatures of 300 to 320° F.

While a preferred embodiment of the invention is here shown and described, it will be understood that skilled artisans may make minor variations without departing from the spirit of the invention and the scope of the appended claims.

I claim:

1. In an apparatus for the simultaneous continuous extrusion molding of a plurality of thermoplastic rods having a device for feeding molten thermoplastic material and a device for engaging the formed rods and applying a braking or pulling force thereon; a die unit between said feeder device and said pulling or braking device including a heated section and a cooled section, said heated section communicating with said feeder device and including a recess having confining side walls diverging from an apex adjacent said feeder device to spread the molten material, a first bar extending across the ends of said diverging walls and separating said heated section from said cooled section, a second bar spaced from said first bar and extending across said cooled section, aligned bores in said bars, a plurality of forming tubes, and means removably retaining said tubes on and between said bars with each in axial alignment with a pair of said aligned bores.

2. The apparatus of claim 1 wherein said first and second bars are removably mounted in said die unit.

3. The apparatus of claim 1 wherein said feeder device includes a heated tube of substantially circular cross section while said spreader recess is substantially rectangular in cross section.

4. The apparatus of claim 1 wherein said recess is bounded by upper and lower substantially flat walls which flare outwardly at their transverse edges between the ends of said diverging side walls, the ends of the bores in said first bar facing said recess flaring outwardly to engage the flared out transverse edges of said recess and thereby provide an enlarged generally smooth area to assist the flow of molten material into said forming tubes.

5. The combination of claim 1 in which said device for engaging the formed rods and applying a braking or pulling force thereon includes a pair of vertically spaced elongated conveyors having endless belts, the formed rods passing between the lower flight of said upper conveyor and the upper flight of said lower conveyor.

6. The combination of claim 5, means to adjust the vertical spacing between said conveyors and means to adjust the speed of rotation of said conveyors.

7. In an apparatus for the simultaneous continuous extrusion molding of a plurality of thermoplastic rods having a device for feeding molten thermoplastic material through a tube and a device to apply a braking or pulling force on the formed rods; a die unit secured to said feeder tube in advance of said braking or pulling device comprising elongated upper and lower plates, a first bar extending transversely between said upper and lower plates and including transversely spaced through bores, said first bar dividing said unit into a first section adjacent said feeder tube and a second section remote therefrom, a member intermediate said upper and lower plates in said first section having a spreader cavity whose confining side walls diverge from an apex adjacent said feeder tube to the ends of said first bar, heater means associated with said upper and lower plates of said first section to keep the material molten therein, a second bar extending transversely between said upper and lower plates of said second section and spaced from said first bar, said second bar including transversely spaced bores longitudinally aligned with said bores in said first bar, elongated open-ended forming tubes removably mounted on and extending between said first and second bars, each forming tube being axially aligned with a pair of aligned bores in said first and second bars, and means to circulate fluid around said forming tubes between said upper and lower plates at a temperature below the solidification point of the material.

8. In an apparatus for the simultaneous continuous extrusion molding of a plurality of thermoplastic rods having a device for feeding molten thermoplastic material and a device for engaging the formed rods and applying a braking or pulling force thereon; a die unit between said feeder device and said pulling or braking device including a heated section and a cooled section, said heated section communicating with said feeder device and including a recess having confining sidewalls diverging from an apex adjacent said feeder device to spread the molten material, a first member extending across the ends of said diverging walls and separating said heated section from said cooled section, a second member spaced from said first member and extending across said cooled section, and a plurality of open-ended forming tubes retained on and between said first and second members and communicative with said recess.

References Cited by the Examiner
UNITED STATES PATENTS

| | | | |
|---|---|---|---|
| 2,075,735 | 3/37 | Loomis | 264—176 X |
| 2,512,844 | 6/50 | Weber | 18—14 |
| 2,730,760 | 1/56 | Bibby | 18—12 |
| 2,736,057 | 2/56 | Davis et al. | 18—12 X |
| 2,759,219 | 8/56 | Meakin | 18—12 |
| 2,774,106 | 12/56 | Bethe | 18—12 X |
| 2,885,730 | 5/59 | Barley et al. | 18—12 |
| 2,887,725 | 5/59 | Vickers et al. | |
| 3,060,512 | 10/62 | Martin et al. | 78—12 |
| 3,114,169 | 12/63 | Palmer et al. | 18—12 |
| 3,118,012 | 1/64 | Kilian | 264—176 |
| 3,121,763 | 2/64 | Indest | 264—176 |

FOREIGN PATENTS

| | | |
|---|---|---|
| 1,222,969 | 1/60 | France. |
| 1,128,969 | 5/62 | Germany. |

WILLIAM J. STEPHENSON, *Primary Examiner.*

ALEXANDER BRODMERKEL, MICHAEL V. BRINDISI, *Examiners.*